March 11, 1969    A. E. MARTENS    3,431,760

ANALOG MEASURING APPARATUS

Filed Aug. 24, 1966

ALEXANDER E. MARTENS
*INVENTOR.*

BY Charles C. Krawzgk

ATTORNEY

United States Patent Office 3,431,760
Patented Mar. 11, 1969

3,431,760
ANALOG MEASURING APPARATUS
Alexander E. Martens, Greece, N.Y., assignor to Bausch
& Lomb Incorporated, Rochester, N.Y., a corporation
of New York
Filed Aug. 24, 1966, Ser. No. 574,666
U.S. Cl. 72—9 15 Claims
Int. Cl. G05d 5/03; G06c 29/00

ABSTRACT OF THE DISCLOSURE

An electrical transducer receives devices to be measured having a desired dimension and variations thereabout and provides electrical signals corresponding to the measured dimension. The electrical signals are converted into direct current signal having an amplitude and polarity depending upon the dimension of the device as a function of the desired dimension. The direct current signal is averaged to provide an output signal that varies in amplitude as a function of average dimensions over a plurality of measurements.

---

This invention relates to measuring apparatus and more particularly to electrical apparatus for measuring a plurality of devices having dimensions within a range of tolerances and provide a statistical measurement of the dimensions exceeding the tolerance.

In high speed manufacturing processes wherein hundreds of devices are being formed per minute, it is extremely difficult, if not impossible, to measure the devices as they are being built (on the fly) and at the same time introduce signals to correct for errors. An added problem is present in the high speed manufacture of flexible devices, such as springs, etc. Due to the resiliency of such flexible devices, they do not generally assume their final shape until the manufacturing process is complete. The difficulty in a dynamic measurement arises from the necessity of measuring the device without constraining the measured device in any way so that a true reading may be made.

Most manufactured items are made with two sets of tolerances specified for each dimension to be controlled, a minimum and a maximum. If the dimensions fall within the tolerances, the device is acceptable, if not they are rejected. With slow speed manufacturing processes an occasional spot check on the product produced is generally sufficient information to make corrections for any error. On the other hand, with high speed manufacturing processes it is important to make a continuous check, or frequent sampling, governed by the production rate, so that statistical error trends due to temperature wear, etc. can be calculated and corrections introduced to compensate for a developing source of error before the tolerances are exceeded.

It is therefore an object of this invention to provide a new and improved electrical measuring circuit.

It is also an object of this invention to provide a new and improved electrical measuring circuit for measuring a plurality of devices having dimensional tolerances and provide a measurement of average error therein.

It is also an object of this invention to provide a new and improved electrical measuring apparatus that is particularly adaptable to measurement of the dimensional tolerances of a plurality of flexible devices and provide a signal corresponding to the average error.

It is still a further object of this invention to provide a new and improved electrical measuring circuit adapted to be employed with automatic feed apparatus for sequentially measuring devices having dimensional tolerances and provide a continuous measurement of the average error therein.

It is also an object of this invention to provide a new and improved electrical measuring circuit adapted to be used in conjunction with high speed manufacturing processes to sequentially measure the devices manufactured having dimensional tolerance and provide a feedback to the manufacturing processes to make corrections in the processes according to an average error in the measured devices.

Electrical apparatus including the invention is adapted to be connected to receive selected samples of devices formed by high manufacturing processes having a desired dimension and provides an electrical signal corresponding to the average dimensional variation of the samples about the desired dimension. Measuring means are included adapted to receive said samples and generate an electrical signal corresponding to a measured dimension thereof. Means are coupled to receive the electrical signal to provide an error signal having a polarity depending upon the dimension of the device being measured with respect to the desired dimension. The error signal is coupled to averaging means that stores the error signal over a period of time to provide an output signal corresponding to the average dimensional variation about the desired dimension.

A further feature of the invention includes the application of the error signal to a servo control system coupled to control the position of a forming tool of the manufacturing process providing a feedback system for automatically compensating for the average error in the dimensions of the produced device.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

Figure 1:
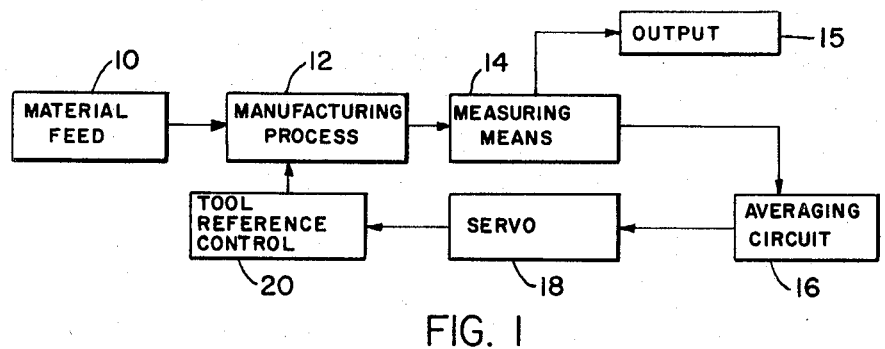
FIGURE 1 is a block diagram of an manufacturing process including the electrical measuring apparatus of the invention.

In the block diagram of FIGURE 1, a material feed mechanism 10 provides a continuous source of material for a high speed manufacturing process 12 of the type capable of producing hundreds of devices per minute. The manufacturing process 12 may for example be an automatic coil spring making machine that receives wire from the material feed mechanism 10 and forms the wire into a desired configuration. Such a process may include mechanical cam or electrical motor operated forming tools that are automatically positioned as the wire is fed in to provide the correct diameter and pitch for the spring. After a sufficient amount of wire is fed in to complete a spring it is cut off to provide the desired length.

The manufacturing of such coil springs requires a flexible type material to provide the desired amount of resiliency in the completed spring. As a result, the final measurements must be made on a completed unconstrained spring. Furthermore, in the manufacturing process wherein hundreds of devices are completed per minute it is extremely difficult, if not impossible, to make dynamic measurements and make measurements therefor on the same time.

Devices such as springs are manufactured to a desired dimension, each having given maximum and minimum tolerances. The final formed device must conform within the tolerances or else be rejected. With high speed manufacturers processes it is highly desirable to provide a continuous check, or frequent sampling governed by the production rate, on the completed product to provide an indication as to the dimensional trends and forseeable sources of error before a large number of rejected units are made.

Such trends can not effectively be made by occasionally measuring a single completed product and make corresponding corrective changes since the measured dimensions of flexible devices may vary from unit to unit. A trend, or source of errors, can be recognized by a continuous check, or frequent sampling governed by the production rate, on a plurality of devices to obtain a measurement of an average value of deviations about the desired dimensions. With this type of measurement a true correction can be made to compensate for a source of, or potential source of errors.

The manufactured devices or selected ones (every second, or third, etc.) produced by the manufacturing process 12 may be conventionally automatically fed into the measuring area of a measuring means 12 of the apparatus including the invention. A measurement of a given dimension is made in the measuring area and a corresponding electrical signal is generated. Once the measurement is completed, the device is suitably ejected to an output unit 15. The electrical signal is applied to an averaging circuit 16 wherein an error signal is developed corresponding to the average dimensional variation of a plurality of tested devices about the desired dimension. The error signal is applied to a servo system 18 which in turn is coupled to drive the tool reference control 20, for correcting the position of the forming tool in the manufacturing process 12 corresponding to the average error in the dimension being measured. Although only one control feedback loop is illustrated in FIGURE 1, it is to be understood that any number of such separate control loops may be included to drive a forming tool or tools corresponding to the dimensions being measured.

Figure 2:
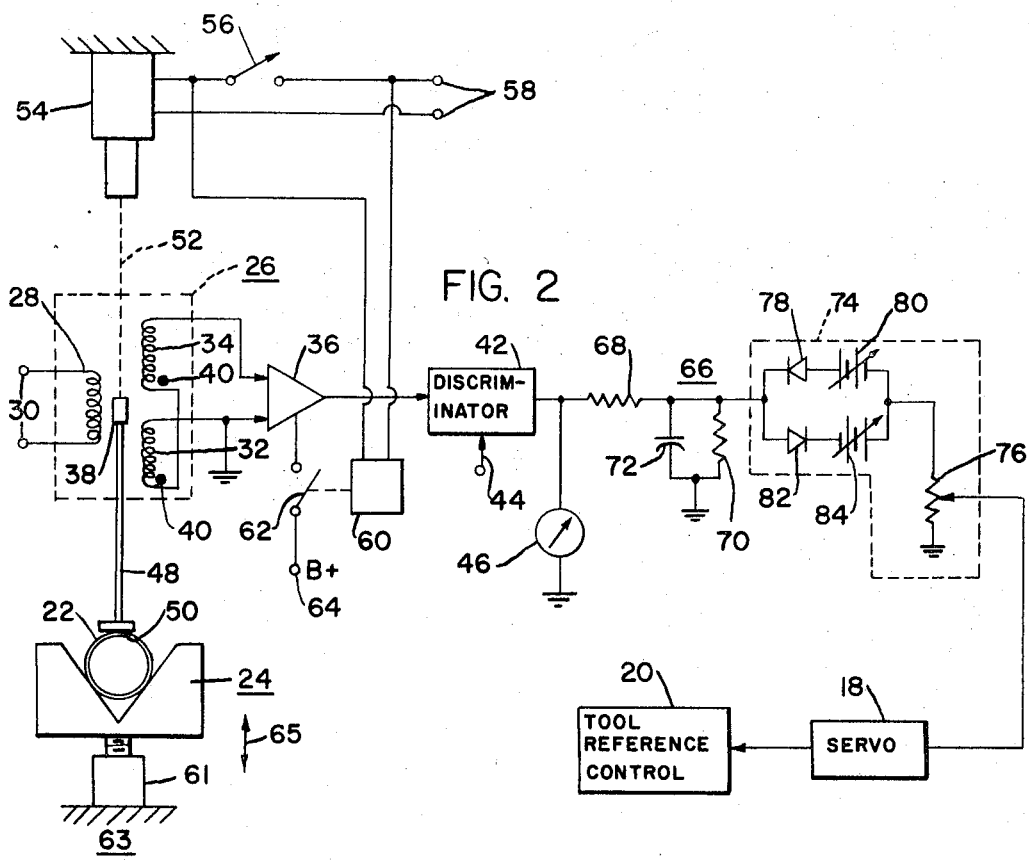
FIGURE 2 is an electrical schematic diagram of a portion of FIGURE 1.

Referring now to FIGURE 2, a device 22 (having a circular cross section for purposes of illustration) is fed into a measuring jig 24 for measuring its diameter by a measuring tool, which in the present embodiment is a linear variable differential transformer 26. The differential transformer 26 has a primary winding 28 having a pair of terminals 30 adapted to be connected to a source of alternating current (A-C) and a pair of series connected secondary windings 32 and 34 connected between ground and an input circuit of an A-C amplifier 36. The differential transformer 26 also includes a movable center core 38 providing variable coupling between the primary winding 28 and the secondary windings 32 and 34. Any displacement of the core from a physical center or balance position produces a difference in the amplitudes of signals generated in the secondary windings 32 and 34. The connection between the secondary windings 32 and 34 is such (as illustrated by the dots 40) that a phase reversal occurs in the signal applied to the amplifier 36 whenever the relative amplitude of signal generated in the secondary windings changes.

The amplified signals are applied to a conventional phase sensitive discriminator circuit 42 having a reference A-C signal applied thereto from a terminal 44. The reference signal is the same signal applied to the terminals 30 so that the discriminator detects the phase and amplitude of the signal applied thereto to produce a pulsating direct current (D-C) error signal which in turn is applied to a meter 46. The error signal has a polarity and amplitude depending upon the dimension of the measured device compared to a standard dimension.

The movable core 38 is attached to an arbor 48 having a flat measuring surface 50. The flat surface 50 touches the portion of the device including the dimension to be measured. The movable core is also connected (as shown by the dashed line 52) to the movable slug of a solenid 54. The coil of the solenoid 54 is connected to be energized by closing a switch 56 to apply power from a pair of terminals 58 adapted to be connected to a source of energizing potential (not shown). Whenever the solenoid 54 is energized, the core 38 is moved toward the solenoid 54 and the arbor 48 is moved away from the jig 24 conditioning the system to receive a device to be measured.

At the same time the solenoid 54 is energized, a time delay circuit 60 is energized to open the switch 62 which instantaneously disables the amplifier 36, in the present embodiment, by removing the energizing potential applied thereto by the terminal 64 (adapted to be connected to a source of energizing potential). This prevents a signal from being applied to the discriminator 42 while a new device is being positioned in the jig 24. After a new device is positioned in the jig 24, the solenoid 54 is deenergized wherein the arbor 48 drops until the surface 50 touches the device being tested. The time delay circuit 60 does not close the switch 62 until a period of sufficient duration for the surface 50 to engage the device 22 has expired.

The measuring area is initially calibrated by inserting a standard device into the jig 24 having the precise desired dimension. A microscrew device 61 is connected between the jig 24 and a stationary base 63 so that jig 24 is adjusted in the direction of the arrows 65 with the standard device therein until a zero signal appears on the meter 46.

With the position of the jig 24 calibrated for zero discriminator 42 output when measuring the precise desired dimension. Any variation from the precise dimension results in a meter reading proportional to the magnitude of variation and having a polarity depending upon the relative size of the measured dimension as compared with the standard. For purposes of illustration it is assumed that a sample having a dimension greater than the precise desired dimension develops a signal having a phase relation with respect to the reference signal applied to the discriminator so that a positive signal is produced. Accordingly, samples having smaller dimensions produces a negative signal.

The discriminator circuit 42 is connected to an averaging resistor capacitor (R-C) network including a resistor 68 connected in series with a parallel circuit including the resistor 70 and capacitor 72. The values of the resistors 68 and 70 and the capacitor 72 are selected so that a direct current voltage is stored across the capacitor 72 corresponding to the magnitude and polarity of the direct current pulses applied thereto. The network has a slow discharge time so that information is stored without appreciable decay during the time between measurements. As a result, the voltage stored across the capacitor 72 represents the overall dimensional average error of a number of devices tested depending primarily on the measuring rate and the time constants of the R-C network 66.

The voltage corresponding to the average error is applied to a variable tolerance limit circuit enclosed within the dashed block 74. The tolerance limit circuit includes two non-linear series limiting circuits connected in parallel, in an opposing relation, between the junction of the resistors 68 and 70 and one of a potentiometer 76. The other end of the potentiometer 76 is connected to ground. One series circuit includes a diode 78 and a variable biasing circuit 80 (illustrated as a battery) while the other series circuit includes a diode 82 and a variable biasing circuit 84. The movable arm of the potentiometer 76 is connected to the servo system 18 which in turn controls the location of the tool reference control 20.

The two series limiting circuits and the potentiometer 76 function to provide a dead band for the system that must be overcome before any feedback adjustment of the tool reference control is made. This dead band is set to approximately approach the tolerance limits of the device being measured. As a result, no adjustment of the tool reference position is made unless the average error approaches one of the maximum or minimum tolerance limits.

What is claimed is:

1. Apparatus adapted to receive a plurality of devices in consecutive order having a desired dimension and variations thereabout, to provide an electrical signal corresponding to the average dimensional variation about said desired dimension comprising:

first means adapted to receive said devices to measure a dimension of said devices and to generate electrical signals corresponding to said measured dimension;

second means coupled to receive said electrical signal to provide an error signal having an amplitude and polarity depending upon the dimension of the device measured as compared with said desired dimension, and third means coupled to receive said error signal and provide an output signal that varies in amplitude as a function of the average dimensional variation about said desired dimension for a plurality of measured devices.

2. Apparatus as defined in claim 1 wherein said first means includes:

transformer means including a movable core having a reference position and extended portion attached to said core;

fourth means for connecting said transformer means so that said transformer means generates a signal, the amplitude and phase thereof, being a function of the position of said core with respect to said reference position;

fifth means for receiving said device so that said dimension to be measured lies in the direction of the movement of said movable core, and sixth means for moving said movable core so that said extended portion engages said device whereby said transformer means generates a signal corresponding to said dimension and said reference point.

3. Apparatus as defined in claim 2 wherein
said second means includes an amplitude and phase detector circuit connected to said transformer means to provide a direct current signal having an amplitude and a polarity a function of the amplitude and phase respectively of said signal generated by said transformer means.

4. Apparatus as defined in claim 3 wherein the amplitude of the direct current signal provided by said detector circuit approaches zero when said movable core is in said reference position.

5. Apparatus as defined in claim 3 wherein said third means comprises an integrator circuit for integrating and storing the direct current signals produced by said detector circuit for a long period to time compared to rate at which said devices are measured thereby providing a signal corresponding to the average dimensional variation about said dimension for a plurality of measured devices.

6. Apparatus adapted to receive a plurality of devices in consecutive order produced by a machine including a movable forming tool comprising:

movable measuring means, including a reference position, adapted to receive said devices and move to engage said devices to generate an electrical signal corresponding to a dimension of said device measured with respect to said reference position;

first means coupled to receive said electrical signal for generating an error signal having an amplitude and polarity that is a function of the measured dimension of the device compared to said reference position;

second means coupled to receive said error signal to provide an average signal that varies in amplitude as a function of the average variation of said error signal for a plurality of devices measured, and feedback means receiving said average signal and coupled to drive said forming tool in a direction to reduce said average signal.

7. Apparatus as defined in claim 6 including:
means for introducing a dead band in the apparatus so that said forming tool is not driven by said feedback means unless said dead band is exceeded.

8. Apparatus as defined in claim 7 wherein:
said measuring means includes transformer means including a movable core having a reference position and extended portion attached to said core;

third means for connecting said transformer means so that said transformer means generates a null signal when said core is in said reference position and a signal having an amplitude and phase determined by the position of said core with respect to said reference position when said core is displaced away from said reference position;

fourth means for receiving said device so that said dimension to be measured lies in the direction of the movement of said movable core, and fifth means for moving said movable core so that said extended portion engages said device whereby said transformer means generates a signal corresponding to said dimension and said reference point.

9. Apparatus as defined in claim 8 wherein said fourth means comprises an adjustable fixture for receiving said devices, said fixture being adjustable in the direction of movement of said movable core whereby said measuring means is precalibrated to develop said null signal by receiving a device having a predetermined dimension and adjusting said fixture for a null signal.

10. Apparatus as defined in claim 8 wherein:
said first means includes an amplitude and phase detector circuit connected to said transformer means to provide a direct current signal having an amplitude and a polarity, a function of the amplitude and phase respectively of said signal generated by said transformer means.

11. Apparatus as defined in claim 9 wherein the amplitude of the direct current signal provided by said detector circuit approaches zero when said movable core is in said reference position.

12. Apparatus as defined in claim 10 wherein said second means comprises an integrator circuit for integrating and storing the direct current signals produced by said detector circuit for a long period of time compared to rate at which said devices are measured thereby providing a signal corresponding to the average dimensional variation about said dimension for a plurality of measured devices.

13. Measuring apparatus comprising:
transducer means receiving an element for generating an electrical signal that is a function of a measured dimension of said element;

circuit means for periodically activating said transducer means for making periodic measurements thereby generating periodically spaced electrical signals corresponding to time spaced measurements;

adjustment means for adjusting said transducer means so that said transducer means generates an electrical signal for each measurement that has an amplitude that is a function of the amount the measured dimension of said element differs from a preset dimension and has one sense when the measured dimension is less than the desired dimension and another sense when the measured dimension is greater than the desired dimension, and circuit means coupled to said transducer means receiving said electrical signals for producing a direct current error signal having amplitude and polarity that both vary as an average function of the sense and the amplitude of said periodic electrical signals.

14. Measuring apparatus as defined in claim 13 wherein:
said transducer means generates an alternating signal;

said adjustment means adjusts said transducer so that a substantially zero amplitude signal is generated when said measured dimension is equal to said preset dimension and said one sense corresponds to a first phase relation and the other sense corresponds to a second phase relation opposite said first phase relation.

15. Measuring apparatus as defined in claim 14 wherein said circuit means comprises:
   a phase sensitive detector circuit coupled to receive periodically spaced alternating signals from said transducer means for generating periodic direct current signals at the periodic rate of said alternating signal having an amplitude corresponding to the amplitude of said alternating signal and having a polarity that is a function of the phase of said alternating signals, and an averaging circuit coupled to receive said periodic direct current signals to provide an average error signal.

References Cited
UNITED STATES PATENTS

| | | | |
|---|---|---|---|
| 3,022,688 | 2/1962 | Sims | 72—9 |
| 3,127,922 | 4/1964 | Bennett et al. | 72—12 |
| 3,170,140 | 2/1965 | Brucker-Steinkuhl | 72—16 |

RICHARD J. HERBST, *Primary Examiner.*

LOWELL A. LARSON, *Assistant Examiner.*

U.S. Cl. X.R.

72—12; 340—149, 172

PO-1050
(5/69)

UNITED STATES PATENT OFFICE
CERTIFICATE OF CORRECTION

Patent No. 3,431,760    Dated March 11, 1969

Inventor(s) ALEXANDER E. MARTENS

It is certified that error appears in the above-identified patent and that said Letters Patent are hereby corrected as shown below:

Column 2, line 66, change "measurements", second occurrence, to -- corrections --

SIGNED AND
SEALED
JAN 20 1970

(SEAL)
Attest:

Edward M. Fletcher, Jr.
Attesting Officer

WILLIAM E. SCHUYLER, JR.
Commissioner of Patents